Nov. 25, 1952          L. GOLDHAMMER          2,619,171

PHOTOGRAPHIC SHUTTER WITH TIME DELAY MECHANISM

Filed Oct. 9, 1950          2 SHEETS—SHEET 1

INVENTOR.
LEO GOLDHAMMER
BY
Connolly and Hutz
HIS ATTORNEYS.

Nov. 25, 1952 L. GOLDHAMMER 2,619,171
PHOTOGRAPHIC SHUTTER WITH TIME DELAY MECHANISM
Filed Oct. 9, 1950 2 SHEETS—SHEET 2

INVENTOR.
LEO GOLDHAMMER
BY
Connolly and Hutz
HIS ATTORNEYS.

Patented Nov. 25, 1952

2,619,171

UNITED STATES PATENT OFFICE 2,619,171

PHOTOGRAPHIC SHUTTER WITH TIME DELAY MECHANISM

Leo Goldhammer, Munich, Germany

Application October 9, 1950, Serial No. 189,270
In Germany October 28, 1949

6 Claims. (Cl. 161—26)

The present invention relates to a photographic shutter, and more particularly to a rotary blade shutter having a time delay mechanism for delaying the opening of the shutter a definite length of time after the shutter has been set in motion.

Shutters of the automatic type such as the so-called rotary blade or centrifugal shutters, as are for example employed in box cameras, are referred to herein. An automatic shutter may be defined for the present purposes as any shutter which upon tripping the shutter trip lever first applies tension upon the shutter blade, and then automatically releases the blade for exposing the exposure opening.

A novel and advantageous feature of this invention resides in a construction in which tripping of the shutter trip lever places the shutter blade under a tension tending to rotate the blade and in addition releases the time delay mechanism. Thus, unlike known shutter structures of a similar type where the time delay mechanism must overcome both the tension of the shutter blade spring and of the return spring of the shutter trip lever, the present time delay mechanism need only release the shutter blade. Consequently the time delay mechanism of the present invention can be dimensioned much smaller than those previously employed.

According to another feature of this invention the shutter trip lever is retained by the time delay mechanism in a shutter blade opening position until the blade has been released for exposure. The time delay mechanism preferably consists of a conventional spring actuated motor that drives a cam. A two-legged angle lever may be used to transfer motion from the shutter trip lever to the cam or from the cam to the lever as required. When the time delay mechanism is wound up and is in time delaying position, one leg of the angle lever lies against the cam so as to keep the motor wound up and to delay movement of the shutter blade. The other leg of the angle lever is then in contact with an elongated arm extending from the shutter trip lever. As the trip lever is tripped the angled lever leg in contact therewith is guided in such a manner that initially the other leg of the angle lever allows the time delay cam to be set in motion and the time delay motor to unwind. Thereafter the shutter trip lever is held in shutter blade opening position by the first mentioned angle lever leg, until the exposure has occurred.

The invention will be more fully described with reference to the appended drawings wherein.

Like numerals refer to like parts throughout the drawings.

Figure 1:
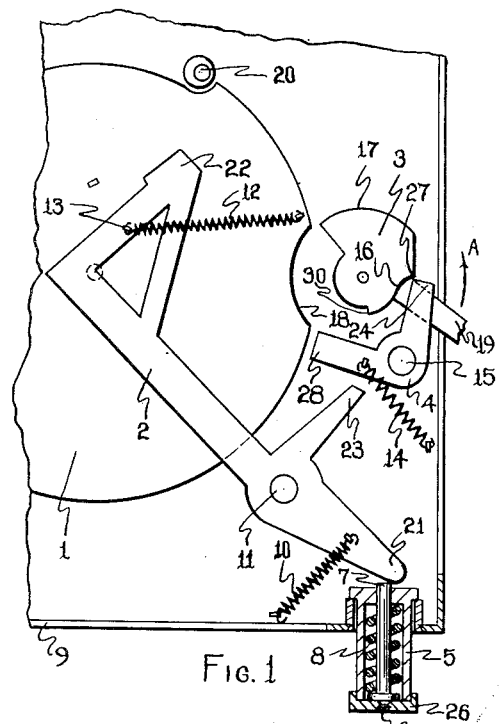
Fig. 1 shows the shutter before tripping and with the time delay mechanism in an inoperative position.

The drawings illustrate a part of a box camera having a rotary blade shutter. The exposure opening and other conventional parts, such as a cover plate for preventing double exposure as the blade rotates first in one direction and then in the other, are not shown. Only those parts of the shutter necessary to the invention are illustrated.

The rotary blade shutter is identified by the reference numeral 1, the shutter trip lever by 2, the time delay mechanism of which only the cam is shown by 3, the angle lever that lies between the time delay mechanism (cam 3) and the shutter trip lever 2 by 4, and the shutter trip button by 5.

The button 5 has a screw cap 26 in which is located a conical thread 6 into which may be screwed a cable release nipple (not shown). Within the shutter trip button are placed a piston 7 and a spring 8 that serves to push the piston 7 back into its original position, when the shutter is activated by means of a cable release (not shown).

Figure 6:
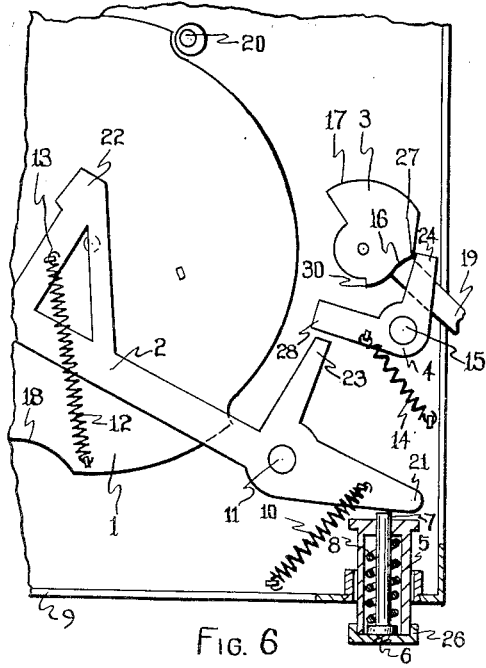
Fig. 6 shows the shutter after the shutter trip lever has been released.

When the trip button 5 is activated by hand, it, together with the piston 7 and the spring 8, are pressed into the interior of the box camera 9. The trip button 5 may be linked to the projection 21 of the shutter trip lever 2 or merely loosely adjoin the projection, as is shown in the drawing. The trip lever 2 is continually drawn by the spring 10 into the position shown in Fig. 1. The center of rotation of the release lever 2 is represented by the reference numeral 11. The shutter blade 1 is connected with the trip lever 2 by means of a tensioning spring 12. Upon rotation of the trip lever 2, spring 12 trips the shutter blade 1, and spring 12 displaces its point of attachment 13 on the arm 22 of the release lever 2 into the position shown in Fig. 6, thereby freeing the exposure opening of the camera.

It may be seen from Fig. 1 that the trip lever 2 can move freely when the cam 3 is not tensioned, because the arm 23 of the trip lever 2 can move past the angle lever 4. The angle lever 4 is continuously drawn by the spring 14 into the position shown in Fig. 2, i. e. it is turned about the axis 15 in a counterclockwise direction. It is hindered in such turning by its arm 24 which bears against the outer-most point 27 of the curve portion 16 of the cam 3, when the spring driven time delay motor (not shown) is not wound up. The curve 16 ends in a blocking hook 30 behind which the arm 24 of the angle lever 4 lies during the time the time delay mechanism is wound up. This position is illustrated in Fig. 2.

Figure 2:
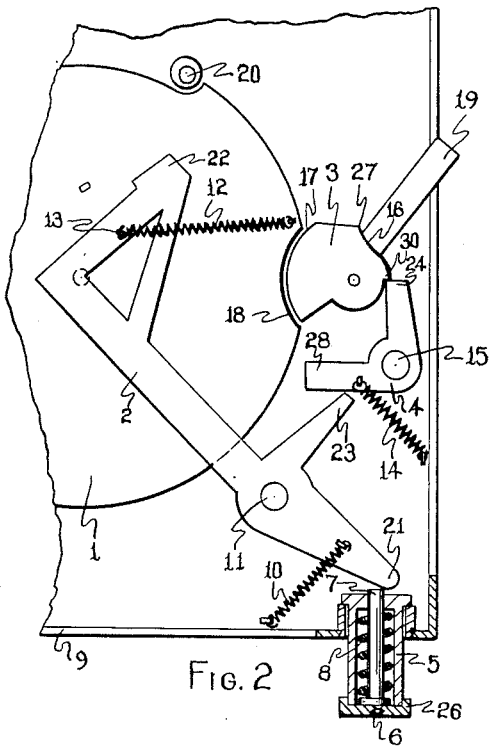
Fig. 2 shows the shutter before tripping and with the time delay mechanism wound in operative position.
Figure 3:
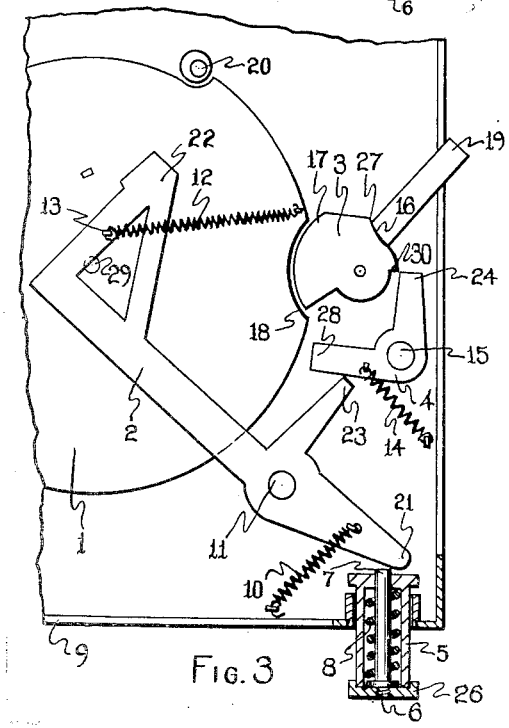
Fig. 3 shows the shutter during tripping.

One can see that the winding lever 19 of the time delay mechanism has been brought into the position shown in Fig. 2 by movement in the direction of the arrow A (see Fig. 1). In this position the cylindrical segment 17 of the cam 3 lies blockingly in the cut-out portion 18 of the shutter disc 1, and the spring motor of the time delay mechanism is wound up. The time delay motor cannot be started however because, in this position, the arm 24 of the angle lever 4 has moved behind the blocking hook 30 of the curve portion 16 of cam 3 due to the pull of the spring 14. Only upon depressing the trip button 5 is the lever arm 28 of the angle lever 4 raised by means of the arm 23 of the trip lever against the action of the spring 14 to such an extent that the arm 24 comes outside the scope of the blocking hook 30 of the cam 3, thereby allowing the spring driven motor of the time delay mechanism to slowly unwind (see Fig. 3).

Figure 4:
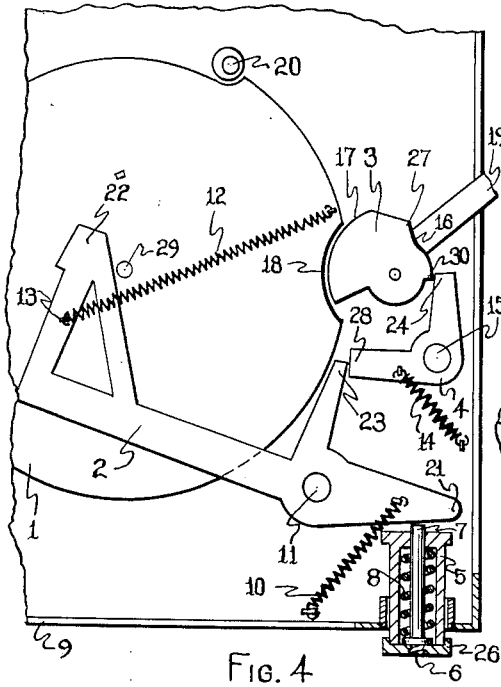
Fig. 4 shows the shutter after it has been tripped.
Figure 5:
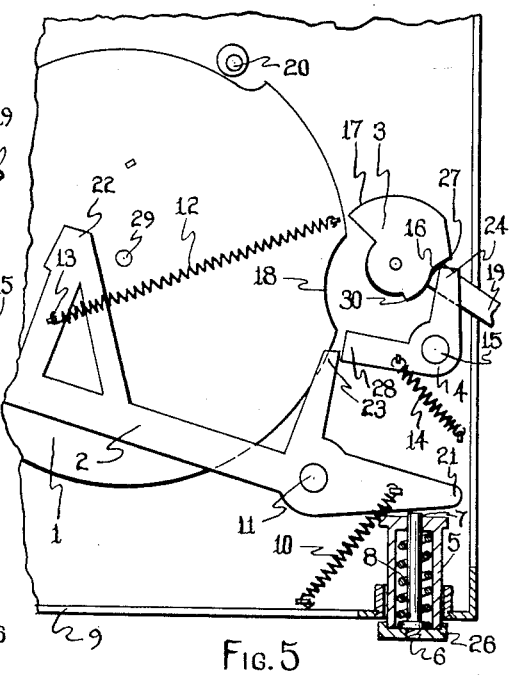
Fig. 5 shows the shutter upon release of the rotary blade shutter.

Upon complete pressing in of the trip button 5, the angle lever 4, after temporarily swinging in a clockwise direction, returns to its original position and holds off with the aid of the arm 28 the arm 23 of the trip lever 2. The trip lever 2 consequently cannot be returned to its initial position by the pull of the spring 10 (see Fig. 4). In this position the shutter disc 1 is tensioned by the swinging of the trip lever, since the shutter spring 12 has been tensioned and has moved beyond the axis 29 of the shutter blade 1. The shutter blade 1 can nevertheless not be thrown into the position shown in Fig. 5 and thereby cause the exposure, because the cylindrical segment 17 of the cam 3 still lies within the cut-out portion 18 of the shutter blade 1. Upon unwinding of the time delay motor the arm 24 of the angle lever 4 slides along the curve 16 of the cam 3 and is thereby slowly moved in a clockwise direction against the effect of the spring 14. The curve 16 is so shaped that, upon unwinding of the time delay mechanism, first the cylindrical segment 17 moves out of the cut-out portion 18 of the shutter blade 1 and untensions the shutter blade (see Fig. 5), and shortly thereafter the lever arm 28 of the angle lever 4 frees the arm 23 of the trip lever 2 allowing trip lever 2 together with the shutter blade 1 to return to their initial positions. The striking stem of the shutter blade 1 is identified by the reference numeral 20.

This invention is particularly useful for taking self-portraits and family group pictures, since the time delay mechanism eliminates the need for anyone to be behind the camera when the picture is snapped. Thus, it is possible to take everyone's picture without requiring the assistance of an extra person to snap the picture.

As many apparently widely different embodiments of this invention may be made without departing from the spirit and scope hereof, it is to be understood that the invention is not limited to the specific embodiments hereof, except as defined in the appended claims.

What is claimed is:

1. A photographic shutter combined with a time delay mechanism for delaying the opening of the shutter for a definite interval of time after the shutter has been tensioned, said shutter comprising a shutter blade and a shutter trip lever for tensioning the blade, and said time delay mechanism comprising means for retaining said time delay mechanism in an energized state until the shutter trip lever has been tripped, thereby tensioning the shutter blade, and means for delaying the operation of said shutter blade during the de-energization of said time delay mechanism.

2. The combination defined by claim 1 and including an intervening element arranged between said shutter trip lever and said time delay mechanism for delaying the return of said shutter trip lever to its position of rest until said time delay mechanism has been de-energized and said shutter blade has been released for operation.

3. The combination defined by claim 2 wherein the intervening element is an angle lever having two legs one of which is arranged to engage said time delay mechanism and the other of which is connected to engage said shutter trip lever.

4. A photographic shutter combined with a time delay mechanism for delaying the opening of the shutter for a definite interval of time after the shutter has been tensioned, said shutter comprising a spring driven rotary blade shutter and a shutter trip lever for tensioning the blade, and said time delay mechanism comprising a spring actuated motor, a lever connected to wind said motor, a cam driven by said motor, and a two-legged angle lever disposed between said cam and said shutter trip lever, said cam having a first surface for engagement with a leg of said angle lever to retain said motor in a wound state, and a second surface for engagement with said rotary blade shutter to delay the rotation of said blade during the unwinding of said motor, said shutter trip lever having an elongated arm extending therefrom for engagement with the other leg of said angle lever to initiate the unwinding of said motor, and said last leg retaining said shutter trip lever in a shutter opening position until said cam has disengaged said rotary blade shutter.

5. The photographic shutter defined in claim 4 wherein the rotary blade shutter has a cut-out portion for receiving a portion of said cam surface for delaying the rotation of said blade.

6. The photographic shutter defined in claim 5 wherein the cam has a curved portion which engages one leg of said angle lever for releasing the shutter trip lever from engagement with the other leg of said angle lever after said cam has disengaged said rotary shutter blade.

LEO GOLDHAMMER.

REFERENCES CITED

The following references are of record in the file of this patent:

UNITED STATES PATENTS

| Number | Name | Date |
|---|---|---|
| 1,093,821 | Bjorlie | Apr. 21, 1914 |
| 1,333,041 | Slocum | Mar. 9, 1920 |
| 1,382,437 | Mason | June 21, 1921 |